United States Patent
Hishinuma

(10) Patent No.: US 10,392,211 B2
(45) Date of Patent: Aug. 27, 2019

(54) SHEET CONVEYANCE APPARATUS, IMAGE READING APPARATUS AND IMAGE FORMING APPARATUS

(71) Applicant: CANON KABUSHIKI KAISHA, Tokyo (JP)

(72) Inventor: Norikazu Hishinuma, Yashio (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/590,196

(22) Filed: May 9, 2017

(65) Prior Publication Data

US 2017/0341886 A1 Nov. 30, 2017

(30) Foreign Application Priority Data

May 31, 2016 (JP) ................... 2016-109324

(51) Int. Cl.
*B65H 3/06* (2006.01)
*B65H 5/06* (2006.01)
(Continued)

(52) U.S. Cl.
CPC .............. *B65H 5/062* (2013.01); *B65H 1/12* (2013.01); *B65H 3/0638* (2013.01); *B65H 3/0669* (2013.01); *B65H 3/0676* (2013.01); *B65H 5/068* (2013.01); *G03B 27/6257* (2013.01); *G03B 27/6264* (2013.01); *G03G 15/23* (2013.01);
(Continued)

(58) Field of Classification Search
CPC ............ B65H 3/0669; B65H 2403/721; B65H 2403/70; B65H 2405/115; B65H 5/062; B65H 5/06; B65H 2601/321
See application file for complete search history.

(56) References Cited

U.S. PATENT DOCUMENTS 6,578,840 B1 * 6/2003 Kudo ................... B65H 3/0669
271/10.01
7,669,496 B2 * 3/2010 Takahashi ............... F16D 7/044
192/46
(Continued)

FOREIGN PATENT DOCUMENTS

JP 09114287 A * 5/1997
JP 10236688 A 9/1998
(Continued)

*Primary Examiner* — Luis A Gonzalez
(74) *Attorney, Agent, or Firm* — Venable LLP

(57) ABSTRACT

A sheet conveyance apparatus includes a conveyance roller to convey a sheet, and a drive transmission mechanism to transmit a driving force from a driving source to the conveyance roller. The drive transmission mechanism includes a shaft, a first rotary member supported on the shaft, a second rotary member supported on the shaft and connected to the conveyance roller, and a coupling member engaged with the first rotary member and rotated integrally with the first rotary member. The coupling member is movable along the shaft between a coupling position, at which the coupling member engages with the second rotary member such that it rotates integrally with the first rotary member, and a release position, at which the coupling member is separated from the second rotary member such that a relative rotation of the second rotary member with respect to the first rotary member is permitted.

15 Claims, 11 Drawing Sheets

(51) Int. Cl.
*B65H 1/12* (2006.01)
*G03B 27/62* (2006.01)
*G03G 15/23* (2006.01)
*G03G 15/00* (2006.01)
*G03G 21/16* (2006.01)
*H04N 1/00* (2006.01)

(52) U.S. Cl.
CPC ....... *G03G 15/602* (2013.01); *G03G 15/6502* (2013.01); *G03G 15/6529* (2013.01); *G03G 21/1647* (2013.01); *G03G 21/1695* (2013.01); *H04N 1/00* (2013.01); *B65H 2402/441* (2013.01); *B65H 2403/20* (2013.01); *B65H 2403/53* (2013.01); *B65H 2403/721* (2013.01); *B65H 2404/144* (2013.01); *B65H 2404/6111* (2013.01); *B65H 2405/115* (2013.01); *B65H 2601/321* (2013.01); *B65H 2801/39* (2013.01); *G03G 2221/1657* (2013.01)

(56) References Cited

U.S. PATENT DOCUMENTS

| 9,354,560 | B2* | 5/2016 | Imaizumi | G03G 21/1647 |
| 9,405,260 | B2* | 8/2016 | Choi | F16D 41/22 |
| 9,586,775 | B2* | 3/2017 | Hosohara | B65H 3/5261 |
| 2015/0172491 | A1* | 6/2015 | Lee | B65H 5/06 |
| | | | | 358/498 |
| 2017/0142265 | A1* | 5/2017 | Horikawa | H04N 1/0057 |
| 2017/0203932 | A1* | 7/2017 | Nagura | B65H 5/06 |

FOREIGN PATENT DOCUMENTS

| JP | 2002070981 A | * | 3/2002 |
| JP | 2008150183 A | * | 7/2008 |

* cited by examiner

SHEET CONVEYANCE APPARATUS, IMAGE READING APPARATUS AND IMAGE FORMING APPARATUS

BACKGROUND OF THE INVENTION

Field of the Invention

The present invention relates to a sheet conveyance apparatus, an image reading apparatus and an image forming apparatus.

Description of the Related Art

Image forming apparatuses such as printers, facsimiles and copying machines are equipped with a sheet conveyance apparatus configured to convey sheets. Such sheet conveyance apparatuses are provided with a conveyance roller pair serving as a rotary conveyance member on a sheet conveyance path configured to convey sheets, and a drive from a driving source such as a motor is transmitted via a drive transmission mechanism to the conveyance roller pair so as to rotate the conveyance roller pair.

During conveyance of sheets, jamming of a sheet (sheet jam) may occur in a state where the sheet is nipped by the conveyance roller pair, and in that case, the user pulls out the sheet while rotating the conveyance roller pair in a state where the driving source is stopped. However, even in a state where the driving source is stopped, if the conveyance roller pair is mechanically coupled with the driving source, i.e., connected to be driven by the driving source, via the drive transmission mechanism, the load applied from the driving source serves as a rotational resistance of the conveyance roller pair when the sheet is pulled out while the conveyance roller pair being rotated, which situation may cause damages such as tears and crumples of the sheet. If the load is high, the sheet may be pulled out without the conveyance roller pair being rotated, and in that case, a surface of the roller may be worn by the sheet.

There has been a configuration for enabling to pull out the sheet without causing damage and without causing the roller surface to be worn, having a drive transmission release member configured to slide a driving gear driven by the driving force in an interlocked manner with the opening of a cover member and releasing the transmission of a drive to a driven gear configured to transmit the drive to the conveyance roller pair (refer to Japanese Unexamined Patent Application Publication No. 10-236688). This drive transmission release member is positioned at a transmission position in which the driving gear is meshed with the driven gear in a state where the cover member is closed. If the guide is opened, the drive transmission release member is moved to a release position in an interlocked manner with the opening of the cover member, and along with the movement of the drive transmission release member, the driving gear slides in the axial direction and the meshing with the driven gear is released.

However, according to the configuration disclosed in the above document, there were cases where release of transmission of driving force could not be performed easily. It was difficult to slide the driving gear due to some reasons, for example, that a helical gear having a gear flank cut obliquely with respect to the rotational axis is utilized as a driving gear, or that the drive is transmitted via a belt using a pulley instead of the driving gear.

SUMMARY OF THE INVENTION

The present invention provides a sheet conveyance apparatus, an image reading apparatus and an image forming apparatus configured to realize smooth release of drive transmission.

According to one aspect of the present invention, a sheet conveyance apparatus includes a rotary conveyance member configured to convey a sheet, a driving source configured to drive the rotary conveyance member, and a drive transmission mechanism configured to transmit a driving force from the driving source to the rotary conveyance member. The drive transmission mechanism includes a shaft, a first rotary member supported on the shaft and configured to rotate by being driven by the driving source, a second rotary member supported on the shaft and configured to rotate the rotary conveyance member, a drive transmission member provided movably in an axial direction of the shaft, and configured to transmit the driving force between the first rotary member and the second rotary member, and a moving unit configured to move the drive transmission member to a transmission position on which the drive transmission member engages the first rotary member and the second rotary member with each other and transmits a rotation of the first rotary member to the second rotary member, and to a release position on which engagement of the first rotary member and the second rotary member are released and the drive transmission member permits a relative rotation of the second rotary member with respect to the first rotary member.

Further features of the present invention will become apparent from the following description of exemplary embodiments with reference to the attached drawings.

DESCRIPTION OF THE EMBODIMENTS

Figure 1:
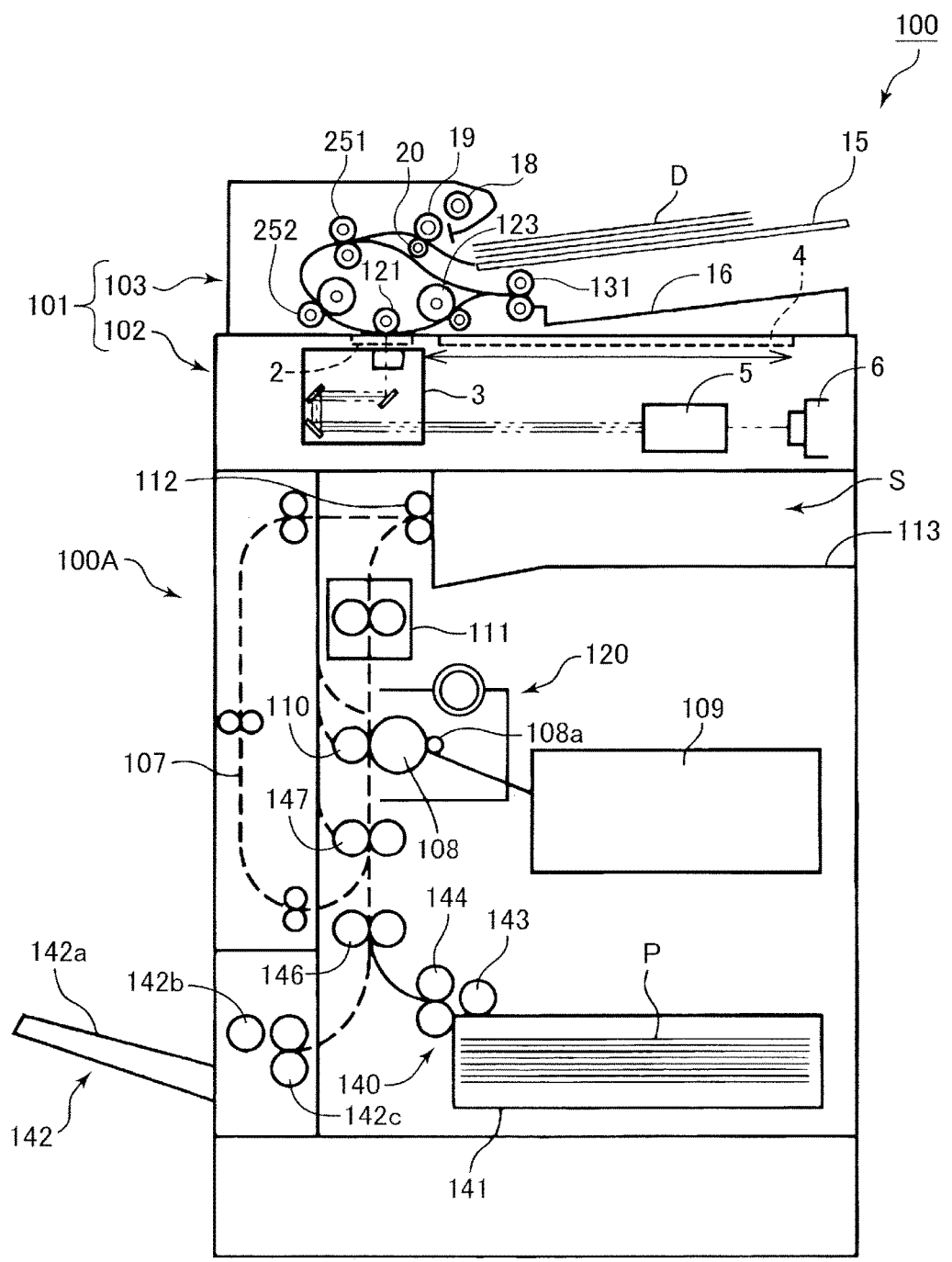
FIG. 1 is a cross-sectional schematic view illustrating an image forming apparatus equipped with an image reading apparatus according to the present disclosure.

Now, an embodiment of the present disclosure will be described with reference to the drawings. FIG. 1 is a cross-sectional schematic view illustrating an image forming apparatus having an image reading apparatus equipped with a sheet conveyance apparatus according to an embodiment of the present disclosure. As illustrated in FIG. 1, an image forming apparatus 100 includes an image reading apparatus 101 configured to read an image on a document D serving as a sheet, and an image forming apparatus body 100A including, for example, an image forming unit 120, which serves as an image forming portion, configured to form an image on a sheet P based on a document image read by the image reading apparatus 101.

The image reading apparatus 101 is equipped with a scanner portion 102 serving as an image reading apparatus body, and an Auto Document Feeder (hereinafter referred to as ADF) 103 serving as a sheet conveyance apparatus provided to be able to open and close on an upper portion of the scanner portion 102. A scanner unit 3 serving as an image reading unit including a lamp configured to project light onto a document, a light reflector, and an optical reduction system configured to guide a reflected light from the document to a photoelectric device 5 while shrinking the same is provided movably in a sub-scanning direction (arrow 2A) on the scanner portion 102. The ADF 103 is a device configured to separate a document D supported on a document support tray 15, and to have the separated document D pass an area above a document feeding-reading glass 2 provided on an upper surface of the scanner portion 102. In such a state where the document D passes the area above the document feeding-reading glass 2, the scanner unit 3 is configured to read the document image.

The image forming apparatus body 100A includes an image forming unit 120, a sheet feeding unit 140 configured to feed a sheet P stored in a sheet feed cassette 141 to the image forming unit 120, and a manual sheet feeding unit 142 configured to feed a sheet placed on a multi-tray 142a to the image forming unit 120. The multi-tray 142a is provided to open and close with respect to the apparatus body 100A, and it is opened during use. Further, the image forming apparatus body 101A includes, for example, a sheet discharge roller pair 112 configured to discharge the sheet P onto which an image has been formed to a sheet discharge space S formed between the image forming apparatus body 101A and the image reading apparatus 101.

The image forming unit 120 includes, for example, a photosensitive drum 108 onto which a toner image is formed, a laser scanner unit 109 configured to project laser beams to the photosensitive drum 108, a transfer roller 110 configured to transfer the toner image onto the sheet P, and a fixing unit 111 configured to fix the toner image onto the sheet. The sheet feeding unit 140 includes a feed roller 143 configured to feed the sheet P from the sheet feed cassette, and a separation roller pair 144 configured to convey the sheet P while separating the sheets one by one.

Next, an image forming operation of the image forming apparatus 100 having the above-described configuration will be described. In a state where an image reading signal is output from a control unit to the image reading apparatus 101, in the case of a feeding-reading mode described later, a document D is conveyed by the ADF 103, and the document is read by the scanner unit 3. The control unit converts the read document image, i.e., image information, to electric signals, and creates an image data, i.e., image reading information, based on the electric signals.

Thereafter, the laser beams corresponding to the image data are projected from the laser scanner unit 109 to the photosensitive drum 108. At this time, the surface of the photosensitive drum 108 is charged in advance by a charging unit 108a, and an electrostatic latent image is formed by irradiating laser beams to the drum 108. Next, the electrostatic latent image is developed by a developing unit not shown, and a toner image is formed on the photosensitive drum 108.

Meanwhile, in parallel with the operation to form toner images to the photosensitive drum 108, a sheet feed signal is output from the control unit to the sheet feeding unit 140 or the manual sheet feeding unit 142. Thereby, the sheet P stored in the sheet feed cassette 141 is fed by the feed roller 143, and the sheet placed on the multi-tray 142a is fed by a manual sheet feed roller 142b. The sheet P fed by the feed roller 143 is separated one sheet at a time by the separation roller pair 144, and thereafter, the sheet P is conveyed by a conveyance roller 146 to a registration roller pair 147. The sheet P fed by the manual sheet feed roller 142b is separated one sheet at a time by a separation roller pair 142c and conveyed, and thereafter, the sheet P is conveyed by the conveyance roller 146 to the registration roller pair 147.

After skew feed is corrected by the registration roller pair 147, the sheet P is fed between the photosensitive drum 108 and the transfer roller 110 at a matched timing with the toner image on the photosensitive drum 108. Thereby, the toner image on the photosensitive drum is transferred by the transfer roller 110 onto the sheet P, and thereafter, the sheet P is conveyed to the fixing unit 111, where heat and pressure is applied to the sheet P and the toner image is fixed to the surface of the sheet P. Then, the sheet P onto which the toner image has been fixed is discharged by the sheet discharge roller pair 112 onto an in-body sheet discharge tray 113 provided at a bottom of the sheet discharge space S.

If images are to be formed on both sides of the sheet, the sheet is subjected to reverse conveyance by switchback conveyance through the sheet discharge roller pair 112, conveyed on a re-conveyance path 107, and sent again to the image forming unit 120. A toner image is transferred to a back side of the sheet at the image forming unit 120, and the toner image is fixed to the sheet at the fixing unit 111. Thereafter, the sheet is discharged by the sheet discharge roller pair 112 onto the in-body sheet discharge tray 113.

Figure 2:
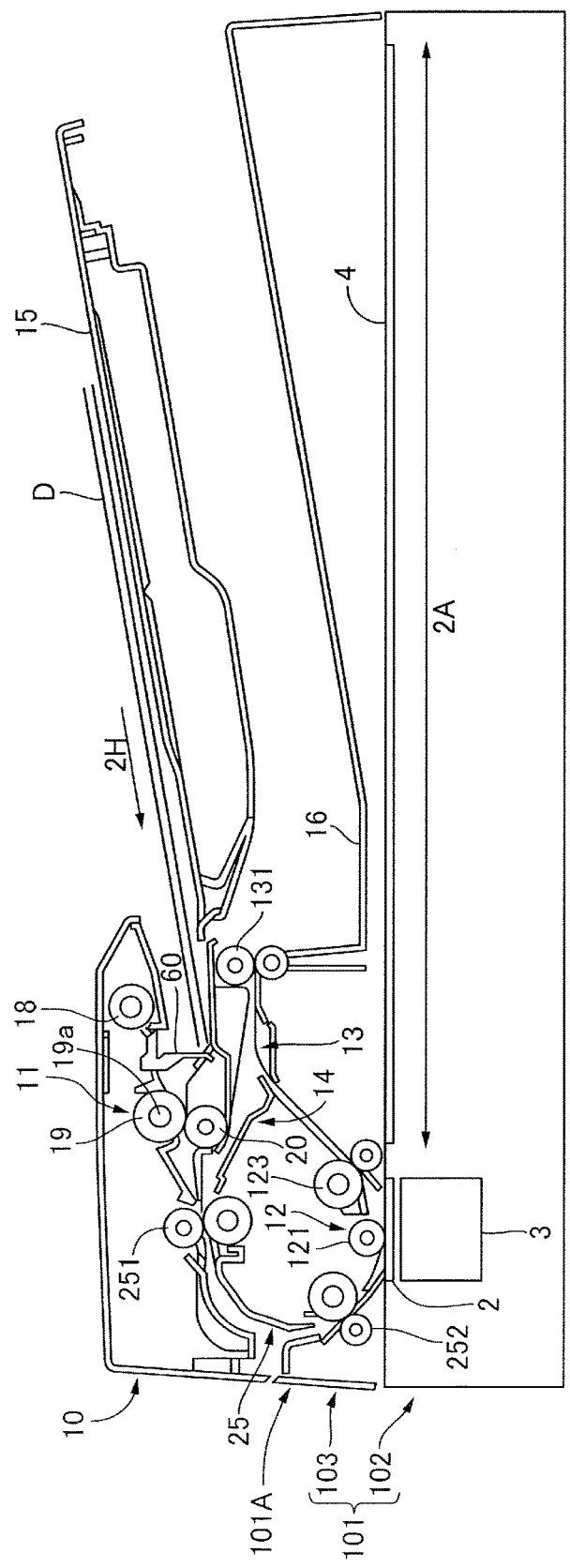
FIG. 2 is an explanatory diagram illustrating a configuration of an ADF provided on the image reading apparatus.

FIG. 2 is a view illustrating a configuration of an ADF, and as illustrated in FIG. 2, the ADF 103 has a separation sheet feeding unit 11 configured to separate the document on the document support tray 15 one sheet at a time and feed the sheet to the document feeding-reading glass 2 in the scanner portion 102. The separation sheet feeding unit 11 includes a document feed roller 18 configured to feed the document D supported on the document support tray 15, and a separation roller pair 19 and 20 configured of a conveyance roller 19 and a retard roller 20 to separate the documents D fed from the document feed roller 18 one sheet at a time. Further, the separation sheet feeding unit 11 has a conveyance roller pair 251 configured to convey the document D separated by the separation roller pair 19 and 20, and a registration roller pair 252 configured to correct skew feed of the document D.

Further, the ADF 103 includes a conveyance unit 12 having a guide roller 121 and a conveyance roller pair 123 configured to pass a document along an upper surface of the document feeding-reading glass 2. Further, the ADF 103 includes a sheet discharge portion 13 having a sheet discharge roller pair 131 capable of rotating in forward and reverse directions and configured to discharge the document having passed the upper surface of the document feeding-reading glass 2, and a sheet discharge tray 16 on which the document discharged from the sheet discharge portion 13 is supported.

The ADF 103 has a switchback portion 14 configured to send a document conveyed in switchback motion by the forward and reverse rotations of the sheet discharge roller pair 131 and being reversed to the separation sheet feeding unit 11, and to feed the document to the upper surface of the document feeding-reading glass 2 again. The document support tray 15 is inclined such that a downstream side thereof in a document feeding direction 2H is positioned lower than an upstream side thereof. The document support tray is configured such that the document can easily slide to the separation sheet feeding unit 11, and such that a space is ensured above the sheet discharge tray 16. A first document feeding-reading glass 2 and a platen glass 4 arranged in a sub-scanning direction of the first document feeding-reading glass 2 is provided on an upper surface of the scanner portion 102.

In the present embodiment, the image reading apparatus 101 is designed to read a document through either a feeding-reading mode, i.e., ADF document reading mode, or a fixed-reading mode, i.e., platen glass document reading mode, selected by the user. The feeding-reading mode is a mode in which the document image is read by having the document pass the area above the scanner unit 3 by the ADF 103. The fixed-reading mode is a mode in which the document image placed on the platen glass 4 by the user is read by moving the scanner unit 3 in the sub-scanning direction.

The ADF 103 is supported to be able to open and close, i.e., pivot, in a vertical direction with respect to the scanner portion 102 by a hinge portion not shown arranged on a back side, such that the platen glass 4 can be opened and closed from a front side. In the case of a fixed-reading mode, the ADF 103 is pivoted upward, to open the area above the platen glass 4 and place the document on the platen glass. Then, in response to the user's operation, the image on the document placed on the platen glass 4 is read by the scanner unit 3 moving in the sub-scanning direction.

Figure 3:
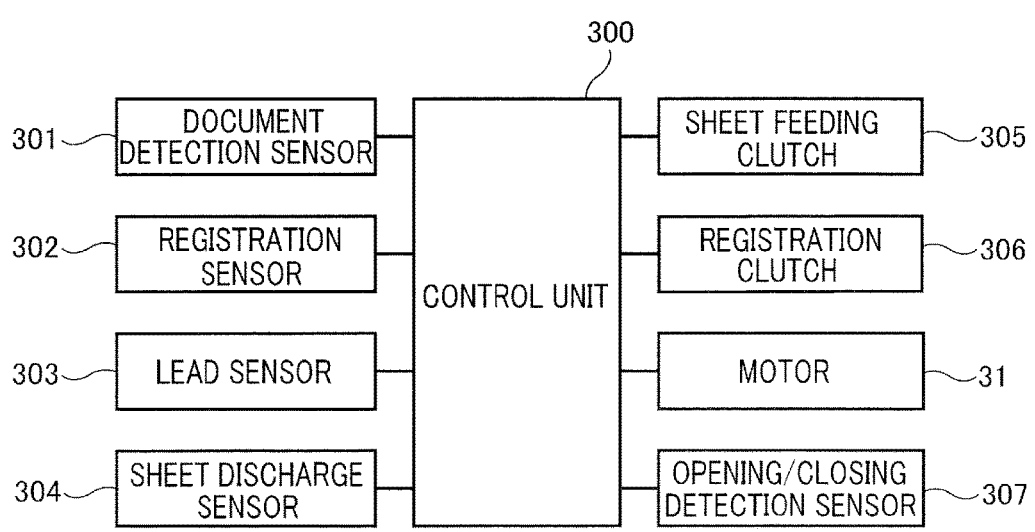
FIG. 3 is a control block diagram of the ADF.

FIG. 3 is a control block diagram of the ADF 103. As illustrated in FIG. 3, a document detection sensor 301 configured to detect presence of a document on the document support tray 15 and a registration sensor 302 configured to detect that the document has reached the registration roller pair 252 are connected to the control unit 300. Further, a lead sensor 303 configured to detect that a document has passed the registration roller pair 252 and a sheet discharge sensor 304 configured to detect that the document having its image read has been discharged to the sheet discharge tray 16 are connected to the control unit 300.

Further, a motor 31 serving as a driving source configured to drive the registration roller pair 252 and the like and a sheet feeding clutch 305 configured to transmit the rotation of the motor 31 to the conveyance roller 19 and the document feed roller 18 are connected to the control unit 300. Further, a registration clutch 306 configured to rotate the registration roller pair 252 at a predetermined timing after correcting skew feed of the document, as described later, and an opening/closing detection sensor 307 configured to detect the opening and closing of an exterior cover 10 described later are connected to the control unit 300. The control unit 300 controls the operation of the sheet feeding clutch 305 and the drive of the motor 31, for example, based on detection signals from as the document detection sensor 301 and the registration sensor 302.

Next, an image reading operation by a feeding-reading mode according to the image reading apparatus 101 configured as above will be described with reference to FIG. 2. In the case of a feeding-reading mode, at first, a document placed on the document support tray 15 is fed by the document feed roller 18, and the document is conveyed to the separation roller pair 19 and 20 configured of the conveyance roller 19 and the retard roller 20. If the documents are overlapped, the retard roller 20 prevents the documents from being conveyed, and the conveyance roller 19 conveys only one sheet of document. After the conveyed sheet enters a sheet conveyance path 25, the sheet is conveyed by the conveyance roller pair 251 to a nip portion of the registration roller pair 252 in a stopped state.

The document is stopped in a state where a leading edge is abutted against a nip portion of the registration roller pair 252, and thereafter, the leading edge follows a nip portion of the registration roller pair 252, according to which the inclination is eliminated, and skew feed is corrected. After correcting skew feed, the registration clutch 306 (refer to FIG. 3) is operated at a predetermined timing, and the registration roller pair 252 is rotated. In the present embodiment, in a state where the registration clutch 306 is engaged, not only the registration roller pair 252 but also the guide roller 121, the conveyance roller pair 123 and the sheet discharge roller pair 131 start to rotate.

Thereby, the document is conveyed by the registration roller pair 252, the guide roller 121 and the conveyance roller pair 123, and passes an upper surface of the document feeding-reading glass 2. In this state, the document image is read by the scanner unit 3, and after the image has been read, the document is discharged by the sheet discharge roller pair 131 onto the sheet discharge tray 16.

In order to read the image formed on the back side of the document, after reading the image on the side, the document is subjected to switchback conveyance by the forward/reverse rotation of the sheet discharge roller pair 131, the document is sent into the separation sheet feeding unit 11 again, and is passed through an upper surface of the document feeding-reading glass 2.

Figure 4:
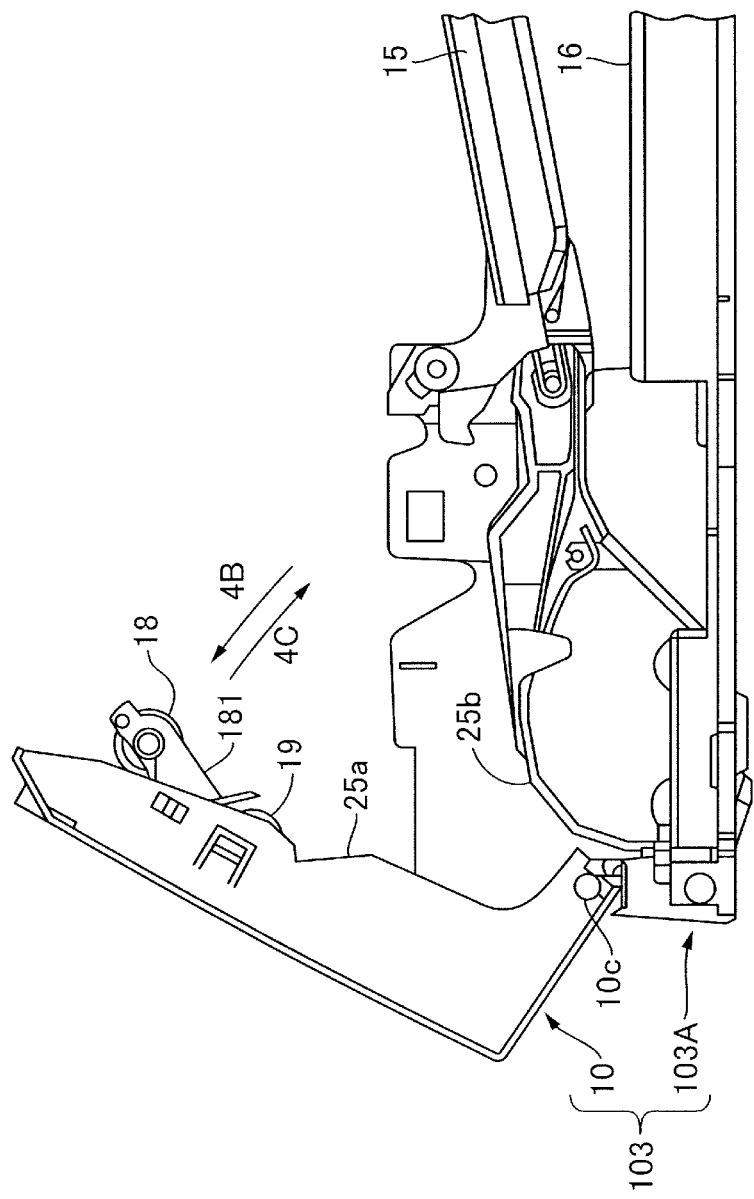
FIG. 4 is a view illustrating a state in which an exterior cover of the ADF is opened.

As illustrated in FIG. 4, an exterior cover 10 serving as an opening and closing member is arranged pivotally in directions shown as an arrow 4B and arrow 4C around a pivot fulcrum 10c on an ADF body 103A serving as an apparatus body of the ADF 103. An upper guide plate 25a is provided on a bottom surface of the exterior cover 10, and in a state where the exterior cover 10 is closed and positioned at a closed position (position illustrated in FIG. 2), the sheet conveyance path 25 illustrated in FIG. 2 is defined between the upper guide plate 25a serving as a guide portion and a lower guide 25b arranged on an upper portion of the ADF body 103A. In a state where the exterior cover 10 is pivoted in the direction of the arrow 4B and moved to an opened position (position of FIG. 4), the upper portion of the lower guide 25b is opened, and the jammed document can be removed easily from the sheet conveyance path 25. Further, maintenance of the sheet conveyance path 25 can be facilitated.

Figure 5:
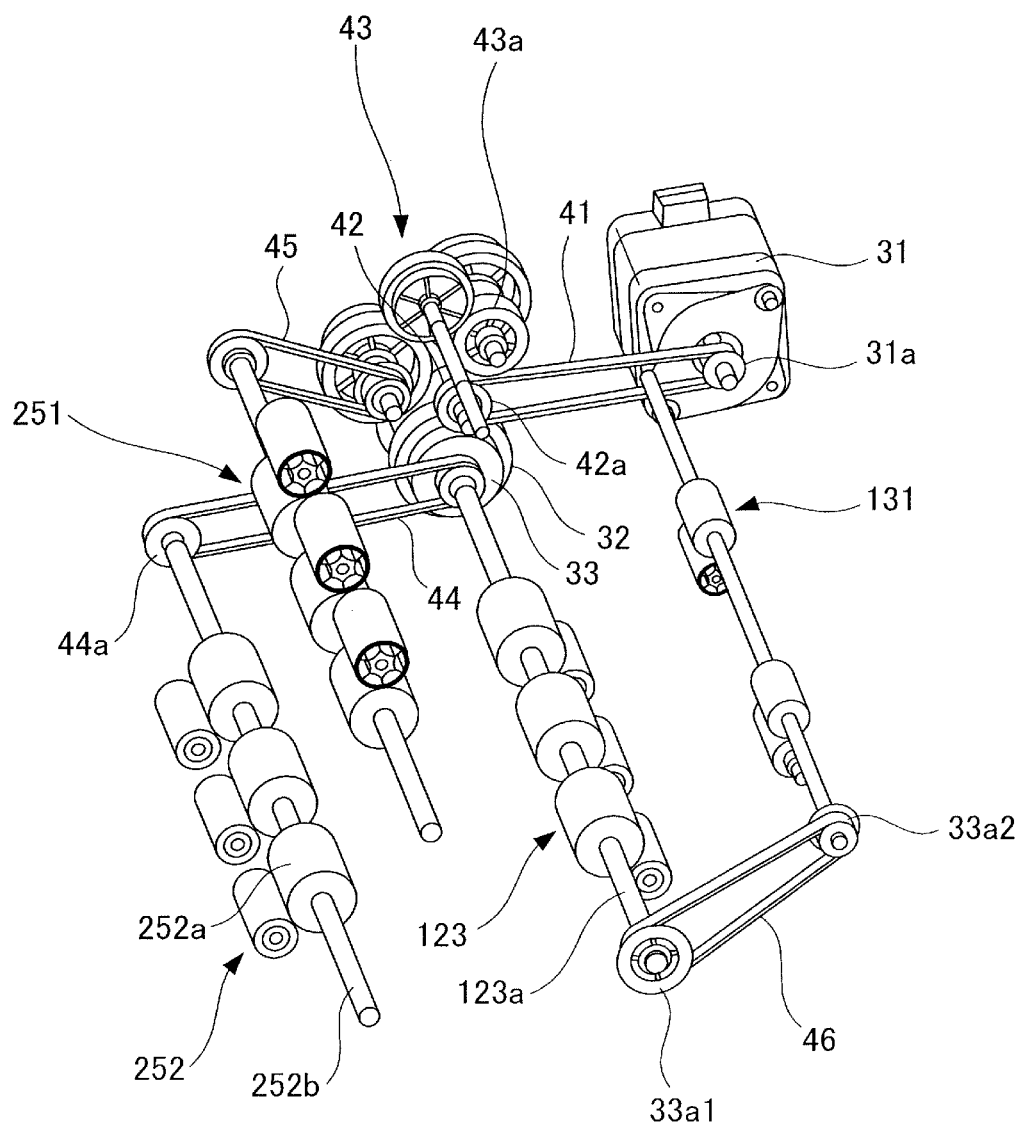
FIG. 5 is a view illustrating a drive mechanism provided on the ADF.

FIG. 5 illustrates a drive mechanism driving the conveyance roller pair 251, the conveyance roller pair 123, the sheet discharge roller pair 131 and the registration roller pair 252. As illustrated in FIG. 5, a motor pulley 31a is attached to a rotation shaft of the motor 31, and a first driving belt 41 is wound around the motor pulley 31a and a first pulley 42a. A driving gear 42 serving as an upstream rotary member is mounted to the first pulley 42a, and a drive transmission gear 32 serving as a first rotary member is meshed with an idler gear 43a constituting a drive transmission gear train 43 in the driving gear 42. The drive transmission gear train 43 is configured to transmit the rotation of the driving gear 42 via a second driving belt 45 to the conveyance roller pair 251.

Figure 6:
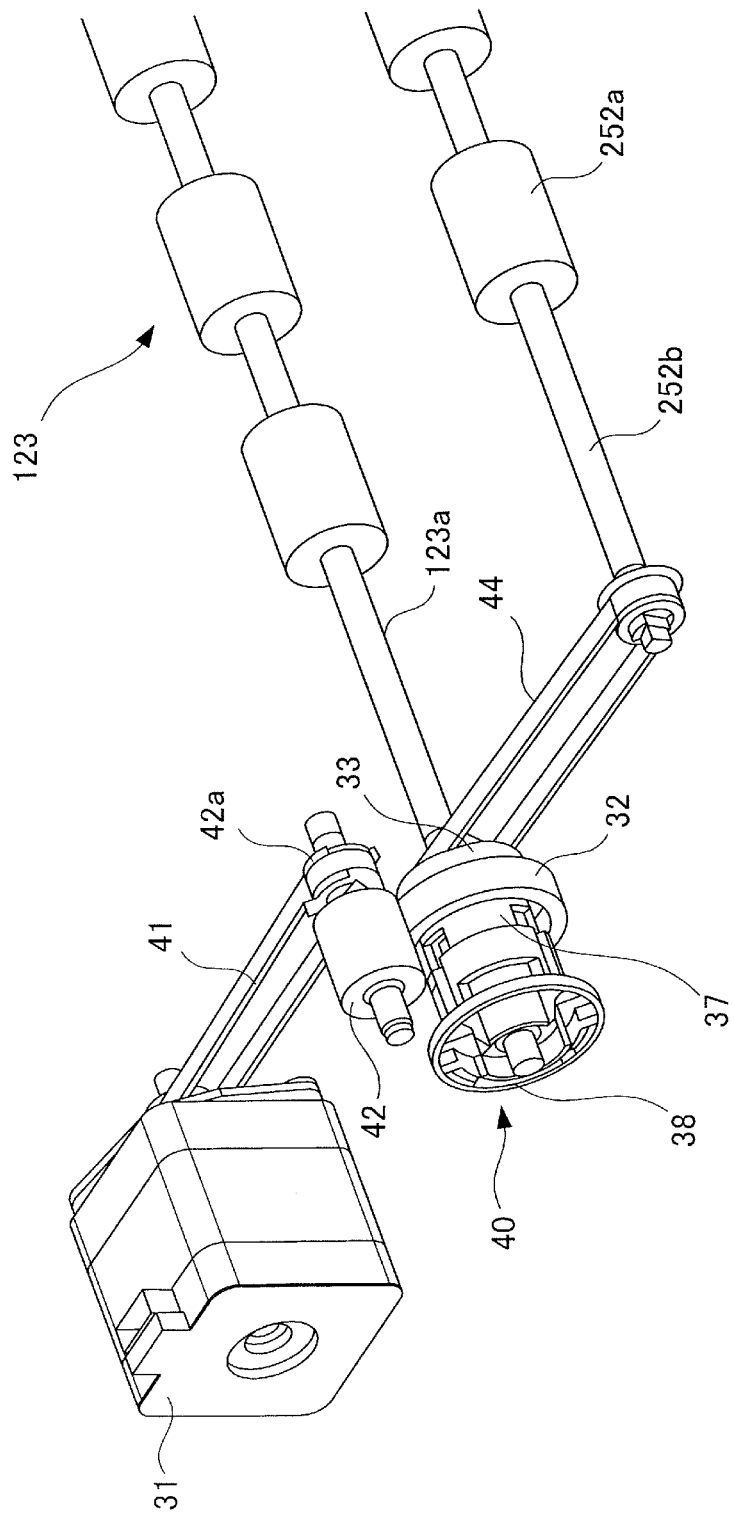
FIG. 6 is an explanatory diagram illustrating a drive transmission mechanism of the drive mechanism.

The drive transmission gear 32 is mounted rotatably in an independent manner to a roller shaft 123a of the conveyance roller pair 123 as an example of the rotary conveyance member, as illustrated in FIG. 6, and if the driving gear 42 is rotated, the drive transmission gear 32 rotates independently around the roller shaft 123a. A drive transmission pulley 33 serving as a second rotary member rotating the conveyance roller pair 123 and the like is fixed to the roller shaft 123a, and the rotation of the drive transmission gear 32 is transmitted via a drive transmission mechanism 40 described later to the drive transmission pulley 33.

A third driving belt 44 configured to transmit drive to the registration roller pair 252 is wound around the drive transmission pulley 33 and a second pulley 44a. That is, the second pulley 44a serving as a downstream rotary member is supported on a shaft 252b arranged in parallel with the roller shaft 123a, and the second pulley 44a being connected via the drive transmission pulley 33 to the drive transmission gear 32 is rotated by the driving force from the motor 31. Further, the conveyance roller pair 123 serves as a first rotary conveyance member, while the registration roller pair 252 corresponds to a second rotary conveyance member driven to rotate by the downstream rotary member. As illustrated in FIG. 5, a third pulley 33a1 is attached to an end portion of the roller shaft 123a of the conveyance roller pair 123 opposite from the drive transmission pulley 33. A fourth driving belt 46 configured to transmit drive to the sheet discharge roller pair 131 is wound around the third pulley 33a1 and a fourth pulley 33a2.

According to this configuration, if the motor 31 is rotated, the rotation of the motor 31 is transmitted via the first driving belt 41 illustrated in FIG. 5 to the driving gear 42, and the rotation of the driving gear 42 is transmitted to the drive transmission gear 32 and the idler gear 43a of the drive transmission gear train 43. The rotation of the driving gear 42 transmitted to the idler gear 43a is transmitted via the second driving belt 45 to the conveyance roller pair 251, and the conveyance roller pair 251 is rotated in the document conveyance direction.

The rotation of the driving gear 42 transmitted to the drive transmission gear 32 is transmitted to the drive transmission pulley 33. The registration clutch 306 is arranged between the drive transmission pulley 33 and the shaft 252b of the conveyance roller 252a constituting the registration roller pair 252. Engagement of the registration clutch 306 causes the rotation of the drive transmission pulley 33 to be transmitted at a predetermined timing via the third driving belt 44 to the registration roller pair 252. Thus, the registration roller pair 252 rotates after correcting skew feed of the document. Further, the rotation of the driving gear 42 is transmitted via the drive transmission pulley 33 to the roller shaft 123a, and the conveyance roller pair 123 is rotated. Moreover, the rotation of the roller shaft 123a is transmitted via the fourth driving belt 46 to the sheet discharge roller pair 131, and the sheet discharge roller pair 131 is rotated.

Figure 7:
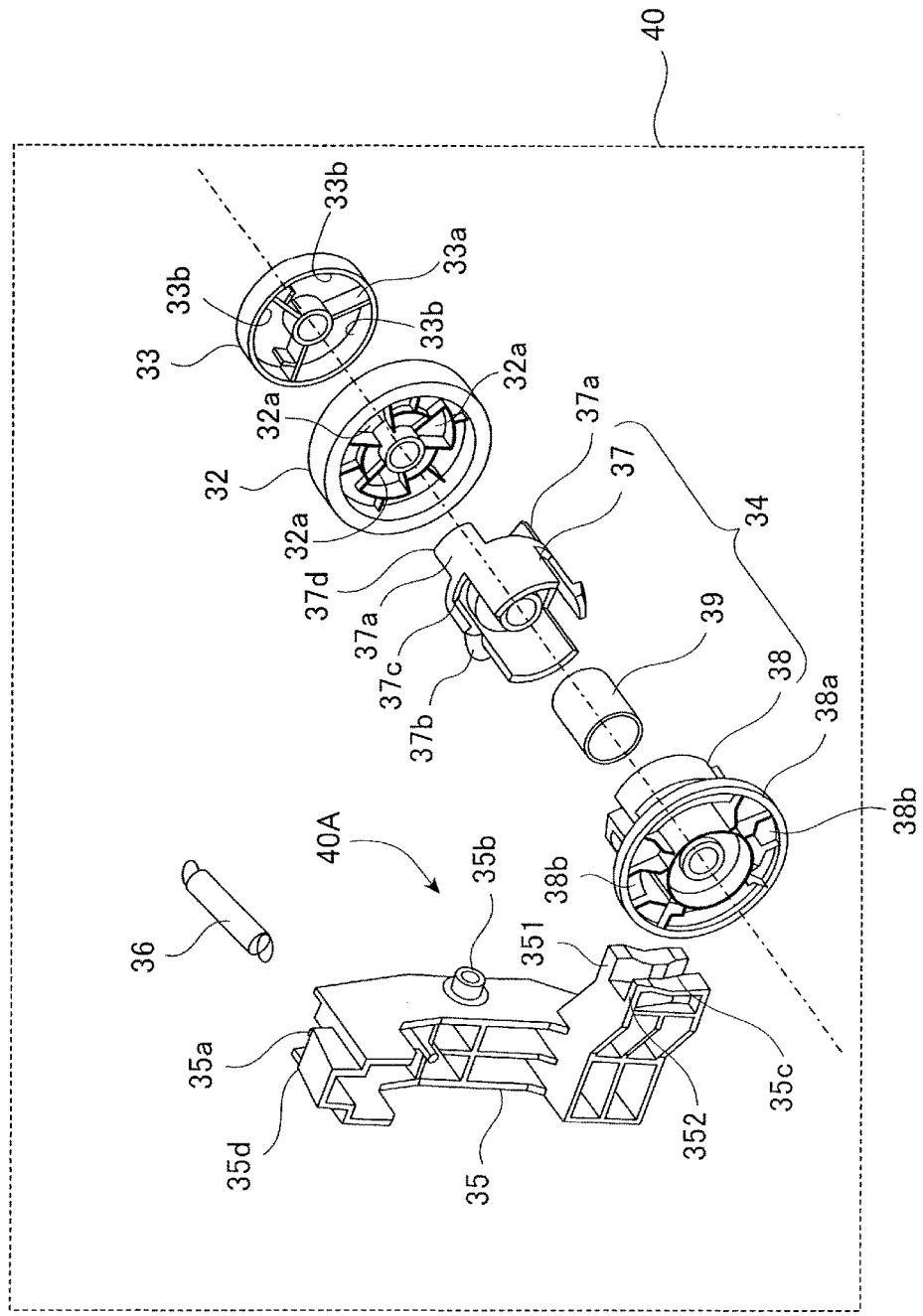
FIG. 7 is an exploded perspective view of the drive transmission mechanism.

FIG. 7 is an exploded perspective view illustrating the configuration of the drive transmission mechanism 40 as an example of the drive transmission mechanism transmitting the rotation of the drive transmission gear 32 to the drive transmission pulley 33. The drive transmission mechanism 40 includes a coupling mechanism 34 configured to transit the rotation of the drive transmission gear 32 to the drive transmission pulley 33, and a drive transmission release lever 35 configured to release the transmission of rotation of the drive transmission gear 32 by the coupling mechanism 34.

The coupling mechanism 34 is configured of a drive engagement claw 37, a lever connecting member 38, and a biasing spring 39 which are respectively mounted coaxially on the roller shaft 123a. The drive engagement claw 37 serving as a drive transmission member transmits the rotation of the drive transmission gear 32 to the drive transmission pulley 33, and includes a body portion 37c supported on the roller shaft 123a and a plurality of (three, in this embodiment) engagement pieces 37a, which are claws that are projected in the axial direction from the body portion 37c.

Insertion holes 32a serving as opening portions, through which the engagement pieces 37a of the drive engagement claw 37 as an example of projected portions are inserted, are formed in the drive transmission gear 32. The drive transmission gear 32 is provided with a same number of insertion holes 32a formed at the same phases as the engagement pieces 37a of the drive engagement claw 37, such that by inserting the engagement pieces 37a to the insertion holes 32a, end portions serving as a first end portion of the engagement piece 37a in the axial direction are projected from the drive transmission gear 32.

The drive transmission pulley 33 is provided with a same number of opening portions 33b through which the end portions of the engagement pieces 37a of the drive engagement claw 37 are projected from the drive transmission gear 32, and a same number of engagement ribs 33a to be engaged with the end portions of the inserted engagement pieces 37a, as the number of the engagement pieces 37a. Then, if the drive transmission gear 32 is rotated and the drive engagement claw 37 is rotated in a state where the end portions of the engagement pieces 37a are inserted to the opening portions 33b of the drive transmission pulley 33, the engagement ribs 33a are pressed by the engagement pieces 37a and the drive transmission pulley 33 is rotated.

As described, if the driving gear 42 is rotated in a state where the engagement pieces 37a are inserted to the opening portions 33b of the drive transmission pulley 33, the drive transmission gear 32 is rotated, and this rotation is transmitted via the drive engagement claw 37 to the drive transmission pulley 33, by which the drive transmission pulley 33 is rotated. As described later, if the engagement pieces 37a of the drive engagement claw 37 are separated from the drive transmission pulley 33, that is, removed from the opening portions 33b, the rotation of the driving gear 42 will not be transmitted to the drive transmission pulley 33 even if the driving gear 42 is rotated, and the drive transmission pulley 33 is not rotated.

The lever connecting member 38 serving as a support member supports the drive engagement claw 37. Lock pieces 37b are formed on a side of the drive engagement claw 37 opposite from the side where the engagement pieces 37a are formed. In a state where the lock pieces 37b are elastically locked to locked portions 38b provided on the lever connecting member 38 and serving as a lock portion, the drive engagement claw 37 is supported on the lever connecting member 38, and the claw 37 is moved integrally with the lever connecting member 38.

The biasing spring 39 serving as a biasing member is disposed between the lever connecting member 38 and the drive engagement claw 37, and biases the drive engagement claw 37 toward the drive transmission pulley 33 such that it is relatively movable in the axial direction with respect to the lever connecting member 38. The drive engagement claw 37 biased by the biasing spring 39 is elastically projected from the drive transmission gear 32, and thereby, the drive engagement claw 37 can be engaged with the drive transmission pulley 33. Hereafter, the direction in which the drive engagement claw 37 is biased by the biasing spring 39 is referred to as a projecting direction. Further, the biasing of the drive engagement claw 37 by the biasing spring 39 prevents the drive engagement claw 37 from being separated from the drive transmission pulley 33 during transmission of drive.

In some cases upon inserting the engagement pieces 37a of the drive engagement claw 37 to the opening portions 33b of the drive transmission pulley 33, the engagement pieces 37a may be abutted against the engagement ribs 33a. In that case, the drive engagement claw 37 is moved while compressing the biasing spring 39 to a retreating direction opposite from the projecting direction in which the transmission of rotation of the driving gear 42 to the drive transmission pulley 33 is released, thereby the drive engagement claw 37 and the drive transmission pulley 33 will not be damaged. Even if the drive engagement claw 37 is biased to the projecting direction by the biasing spring 39, the drive engagement claw 37 locks the lock pieces 37b to the locked portions 38b provided on the lever connecting member 38, such that the drive engagement claw 37 is supported without being separated from the lever connecting member 38.

Further, in a state where the drive transmission gear 32 is rotated and the drive engagement claw 37 is rotated after the drive engagement claw 37 has moved to the retreating direction, the abutment against the engagement ribs 33a is released. If the abutment is released, the drive engagement claw 37 is moved by a restoring force of the biasing spring 39 to a transmission position where the engagement pieces 37a enter the opening portions 33b of the drive transmission pulley 33, and the transmission of the drive is enabled.

In the present embodiment, the end portion of the engagement piece 37a has a tapered surface 37d formed such that a width in the circumferential direction further decreases as the tapered surface 37d extends downstream in a projecting direction of the projected portion. Thus, along with the rotation of the drive transmission gear 32, the engagement pieces 37a of the drive engagement claw 37 will reliably enter the opening portions 33b of the drive transmission pulley 33.

A flange-shaped lever engagement rib 38a to be engaged with the drive transmission release lever 35 is formed to the lever connecting member 38. Then, if the drive transmission release lever 35 swings, as described later, the lever connecting member 38 is pressed by the drive transmission release lever 35 via the lever engagement rib 38a, and moves in the axial direction integrally with the drive engagement claw 37. In other words, according to the present embodiment, the drive transmission release lever 35 serving as the interlocking member and the lever engagement rib 38a of the lever connecting member 38 constitute a moving unit 40A configured to move the drive engagement claw 37.

The drive transmission release lever 35 is provided swingably around a swing shaft 35b arranged orthogonal to the roller shaft 123a. A press-contact portion 35d pressed by a pressing portion 10a (refer to FIGS. 8A and 8B) on the exterior cover 10 is formed on an upper surface at an upper end, i.e., a first swing end, of the drive transmission release lever 35 in a state where the exterior cover is closed. A spring mounting portion 35a to which a second end of a lever biasing spring 36 serving as an urging member, i.e., an interlocking-member biasing member, having a first end attached to a frame is to be attached is provided on an upper end portion of the drive transmission release lever 35. An engagement portion 35c serving as a contact portion capable of abutting against the lever engagement rib 38a of the lever connecting member 38 is provided on a side surface on a lower end portion serving as a second swing end portion of the drive transmission release lever 35. The engagement portion 35c has a first pressing portion 351 and a second pressing portion 352 formed to oppose to one another, and the lever engagement rib 38a of the lever connecting member 38 is inserted between the first pressing portion 351 and the second pressing portion 352.

Figure 8A:
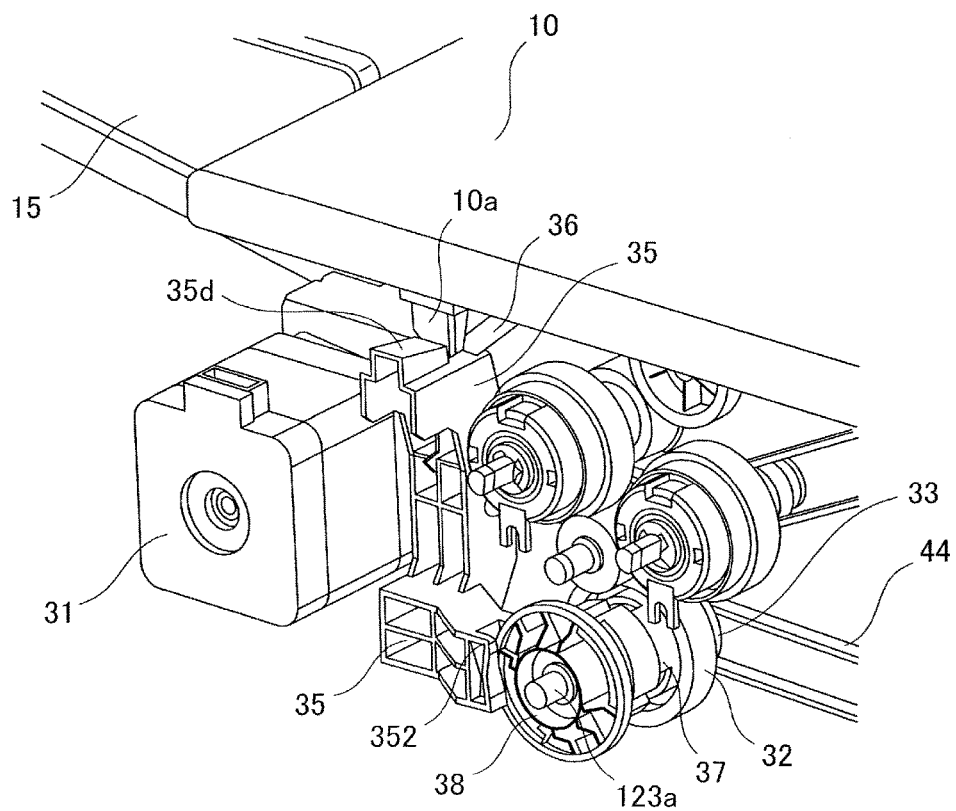
FIG. 8A is a perspective view illustrating the drive transmission mechanism in a drive transmission state.
Figure 8B:
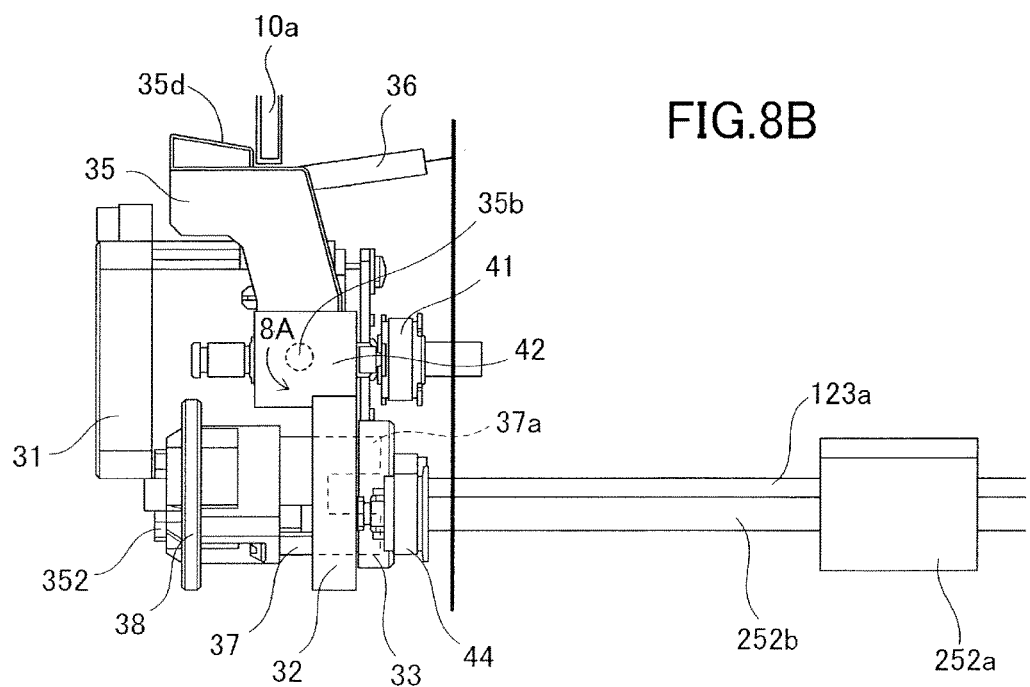
FIG. 8B is a side view of the drive transmission mechanism in the drive transmission state.
Figure 9A:
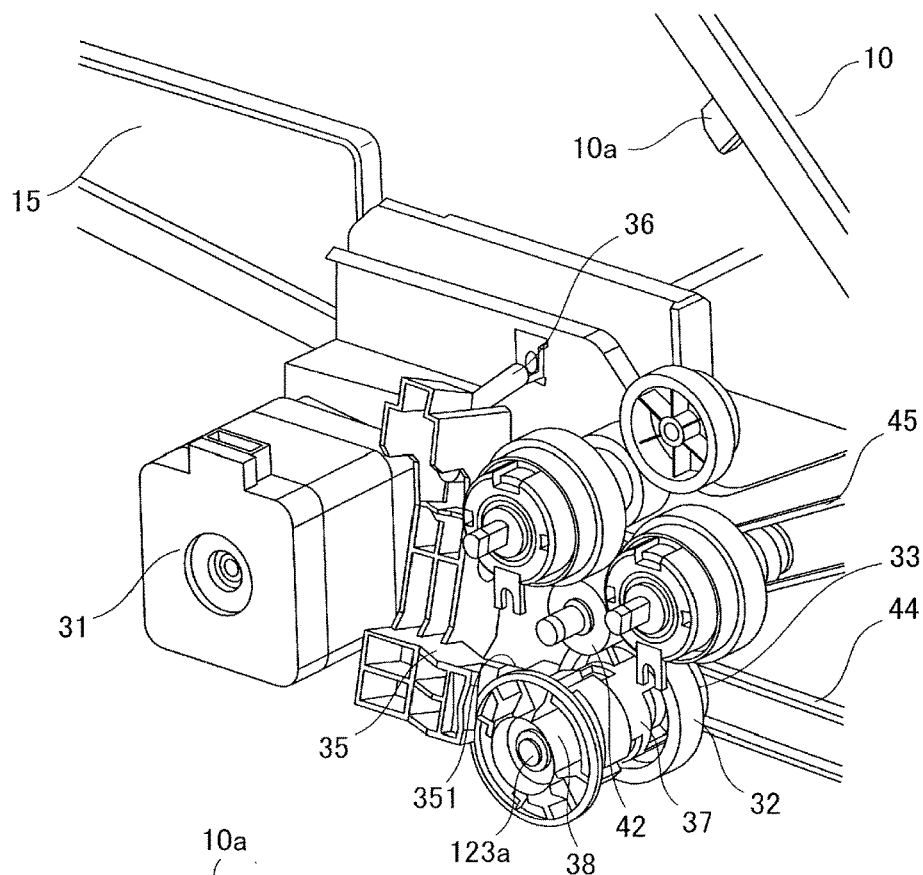
FIG. 9A is a perspective view illustrating the drive transmission mechanism in a drive transmission release state.
Figure 9B:
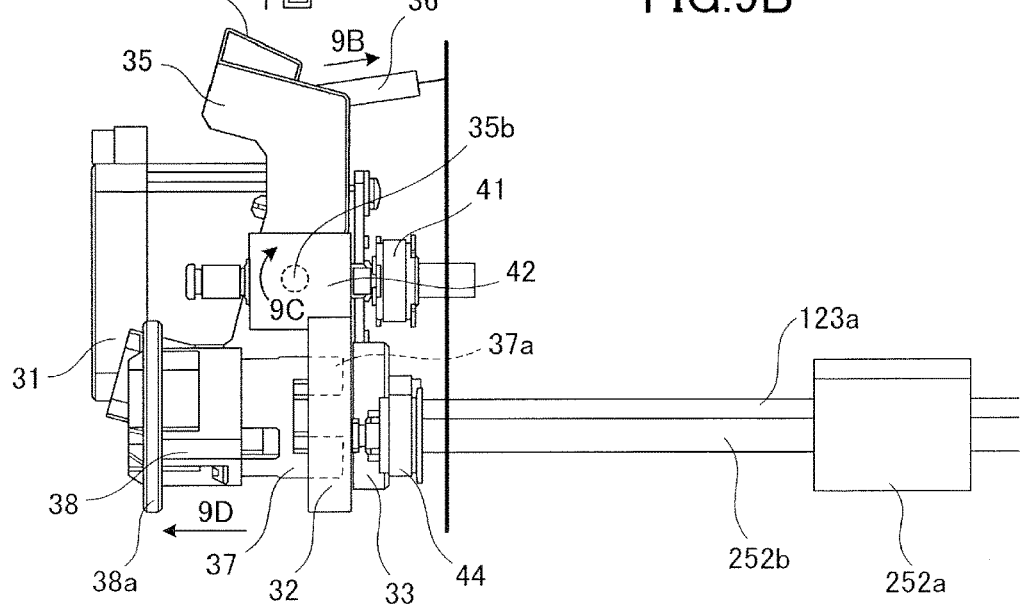
FIG. 9B is a side view illustrating the drive transmission mechanism in the drive transmission release state.

As illustrated in FIG. 8B, the drive transmission release lever 35 is configured such that, in a state where the press-contact portion 35d is pressed by the pressing portion 10a of the exterior cover 10, the lever 35 swings in a first direction (direction of arrow 8A) moving the drive engagement claw 37 in the projecting direction around the swing shaft 35b against the lever biasing spring 39. Further, the drive transmission release lever 35 is configured such that, in a state where the pressure from the pressing portion 10a of the exterior cover 10 is released, as illustrated in FIGS. 9A and 9B, the lever swings in a second direction (direction of arrow 9C) in which the drive engagement claw 37 is moved in the retreating direction around the swing shaft 35b by the restoring force of the lever biasing spring 39.

Next, a drive transmission action of the drive transmission mechanism 40 configured as above will be described with reference to FIGS. 8A and 8B. FIG. 8A is a perspective view of a state in which the exterior cover 10 is closed, that is, in a state where the drive transmission mechanism 40 is in a drive transmission state, and FIG. 8B is a left side view of a state in which the drive transmission mechanism 40 is in the drive transmission state.

As illustrated in FIGS. 8A and 8B, the pressing portion 10a is provided on a bottom surface of the exterior cover 10, and in a state where the exterior cover 10 is closed, the press-contact portion 35d of the drive transmission release lever 35 is pressed from above by the pressing portion 10a. The upper surface of the press-contact portion 35d pressed by the pressing portion 10a is inclined such that an end portion at a closer distance from the swing shaft 35b is arranged lower than an end portion distance from the swing shaft 35b. Thus, if the exterior cover 10 is closed, the press-contact portion 35d is pressed, and the drive transmission release lever 35 is swung in a first direction with the swing shaft 35b serving as a fulcrum, against the biasing force of the lever biasing spring 39.

In a state where the drive transmission release lever 35 is swung in the first direction, as described, the second pressing portion 352 of the drive transmission release lever 35 presses the lever engagement rib 38a of the lever connecting member 38 in the projecting direction. Thereby, the drive engagement claw 37 moves in the axial direction integrally with the lever connecting member 38, such that the end portions of the engagement pieces 37a of the drive engagement claw 37 project from the insertion holes 32a of the drive transmission gear 32, and move to a transmission position where they enter the opening portions 33b of the drive transmission pulley 33.

Thereafter, if the exterior cover 10 is closed, the drive transmission release lever 35 moves to a second position in which the drive engagement claw 37 illustrated in FIG. 8A is moved to a second position corresponding to the transmission position. In a state where the exterior cover 10 is closed against the biasing force of the lever biasing spring 39, the pressing portion 10a of the exterior cover 10 being closed is pressed against the side surface of the press-contact portion 35d constituting the regulation portion, such that the drive transmission release lever 35 is maintained at the second position.

In a state where the exterior cover 10 is closed, as described, the drive transmission release lever 35 swings in the first direction around the swing shaft 35b, and in connection therewith, the drive engagement claw 37 moves in the projecting direction integrally with the lever connecting member 38, and moves to a transmission position. Thereby, the drive transmission gear 32 and the drive transmission pulley 33 enter a drive transmission state via the drive engagement claw 37. If the motor 31 is rotated in this state, the drive transmission pulley 33 is rotated in synchronization with the drive transmission gear 32, and the conveyance roller pair 123, the registration roller pair 252 and so on are rotated.

Next, an operation to release the transmission of drive by the drive transmission mechanism 40 so as to remove a document jammed in a state nipped by the conveyance roller pair 251 or the registration roller pair 252, for example, will be described with reference to FIGS. 9A and 9B. FIG. 9A is a perspective view of a state in which the exterior cover 10 is opened, that is, in a state where the drive transmission mechanism 40 is in a drive transmission release state, and FIG. 9B is a side view of a state in which the drive transmission mechanism 40 is in a drive transmission release state.

If the exterior cover 10 is opened, the pressing portion 10a of the exterior cover 10 is moved in a direction of arrow 9A illustrated in FIG. 9B, and pressure contact of the press-contact portion 35d of the drive transmission release lever 35 against the pressing portion 10a of the exterior cover 10 is released. Thereby, the drive transmission release lever 35 is pulled in the direction of arrow 9B by the restoring force of the lever biasing spring 36, the drive transmission release lever 35 is swung in a second direction illustrated by arrow 9C, and moves to a first position in which the drive engagement claw 37 illustrated in FIG. 9A is positioned at a release position.

Thereby, in a state where the drive transmission release lever 35 is moved to the first position, the first pressing portion 351 of the drive transmission release lever 35 presses the lever engagement rib 38a of the lever connecting member 38 to the retreating direction. Thus, the drive engagement claw 37 moves in the axial direction integrally with the lever connecting member 38, and the end portions of the drive engagement claw 37 are moved to a release position being released from the opening portions 33b of the drive transmission pulley 33. In a state where the drive transmission release lever 35 is moved to the first position, it is retained at the first position by abutting against a stopper.

If the exterior cover 10 is opened as described above, the drive transmission release lever 35 swings in the second direction around the swing shaft 35b, and in an interlocked manner, the drive engagement claw 37 moves in the retreating direction integrally with the lever connecting member 38, and moves to the release position. Thereby, the transmission of drive between the drive transmission gear 32 and the drive transmission pulley 33 is released, such that if the motor 31 is rotated in this state, the drive transmission gear 32 is rotated, but the drive transmission pulley 33 is not rotated. Further, since the transmission of drive is released as described, if a jammed document is pulled out, the document can be pulled out by rotating the conveyance roller pair 251 and the registration roller pair 252 without applying excessive load.

As described, according to the present embodiment, the drive transmission gear 32 rotated by the motor 31 is attached rotatably in an independent manner from the roller shaft 123a, and the drive engagement claw 37 is enabled to move between the transmission position and the release position by the moving unit 40A. Then, if a document is jammed, the exterior cover 10 is opened, by which the drive engagement claw 37 is moved from the transmission position to the release position, and the transmission of drive of the motor can be released without moving the drive transmission gear 32 and the drive transmission pulley 33.

It is noted that a substitute configuration of the present embodiment is conceivable in which the drive transmission gear 32 and the drive transmission pulley 33 are connected via a dog clutch, and the drive transmission gear 32 is slid in the axial direction while maintaining engagement with the driving gear 42, by which the drive transmission to the drive transmission pulley 33 can be released. However, there are increasing demands to reduce noise generated in sheet conveyance apparatuses, and in order to reduce noise, for example, there are cases where a helical gear having a gear flank cut in an inclined manner with respect to the rotational axis is used for transmitting the drive instead of a spur gear, or where a drive is transmitted by a belt and a pulley. In a state where a helical gear is used as the drive transmission gear 32 and the driving gear 42, if the drive transmission gear 32 is slid to release drive transmission, the inclination of the gear flank of the drive transmission gear 32 and the gear flank of the driving gear 42 prevents the drive transmission gear 32 from sliding, unless they are relatively rotated. Therefore, a large force becomes necessary in order to slide the drive transmission gear 32.

Further, if the drive is transmitted using a belt and a pulley, such as in a state where the drive transmission gear 32 and the driving gear 42 are replaced with a pair of pulleys and a belt stretched thereon, one of the pulleys serving as the rotary member for rotating the belt must be slid in the axial direction to release transmission of the drive, but in this state, the counterpart pulley on which the belt is stretched must be moved together with the belt. As described, in a configuration where the drive is transmitted via a belt and pulleys, it is necessary to move at least two pulleys and a belt to release the drive transmission, and the drive transmission release mechanism becomes complex. Further, an area for moving the belt and the pulley becomes necessary, and the size of the sheet conveyance apparatus is increased. As described, if the rotary member such as the gear or the pulley is moved to release the drive transmission, either a large force is required, or the mechanism to release the drive transmission becomes complex.

Meanwhile, according to the present embodiment, by moving the drive engagement claw 37 from the transmission position to the release position, the transmission of drive of the motor 31 can be released without moving the drive transmission gear 32 and the drive transmission pulley 33, in other words, by a relatively small force. Thereby, drive transmission can be released without applying a large force, even in a state where a helical gear is used as the driving gear 42 or the drive transmission gear 32. Further, in a configuration where the drive is transmitted using a belt and pulleys, as according to the present embodiment, since there is no need to move the pulley and the belt, the configuration for releasing the transmission of the drive will not be complex, and the increase in size of the apparatus can be prevented.

By moving the drive engagement claw 37 to the release position, the drive transmission to the drive transmission pulley 33 positioned downstream of the drive transmission gear 32 in the drive transmission passage from the motor 31 can be released. Thus, the drive transmission to a plurality of members can be released easily, and for example, in a state where the drive transmission by the drive transmission mechanism 40 is released, the registration roller pair 252 can rotate idly with the conveyance roller pair 123.

Figure 10:
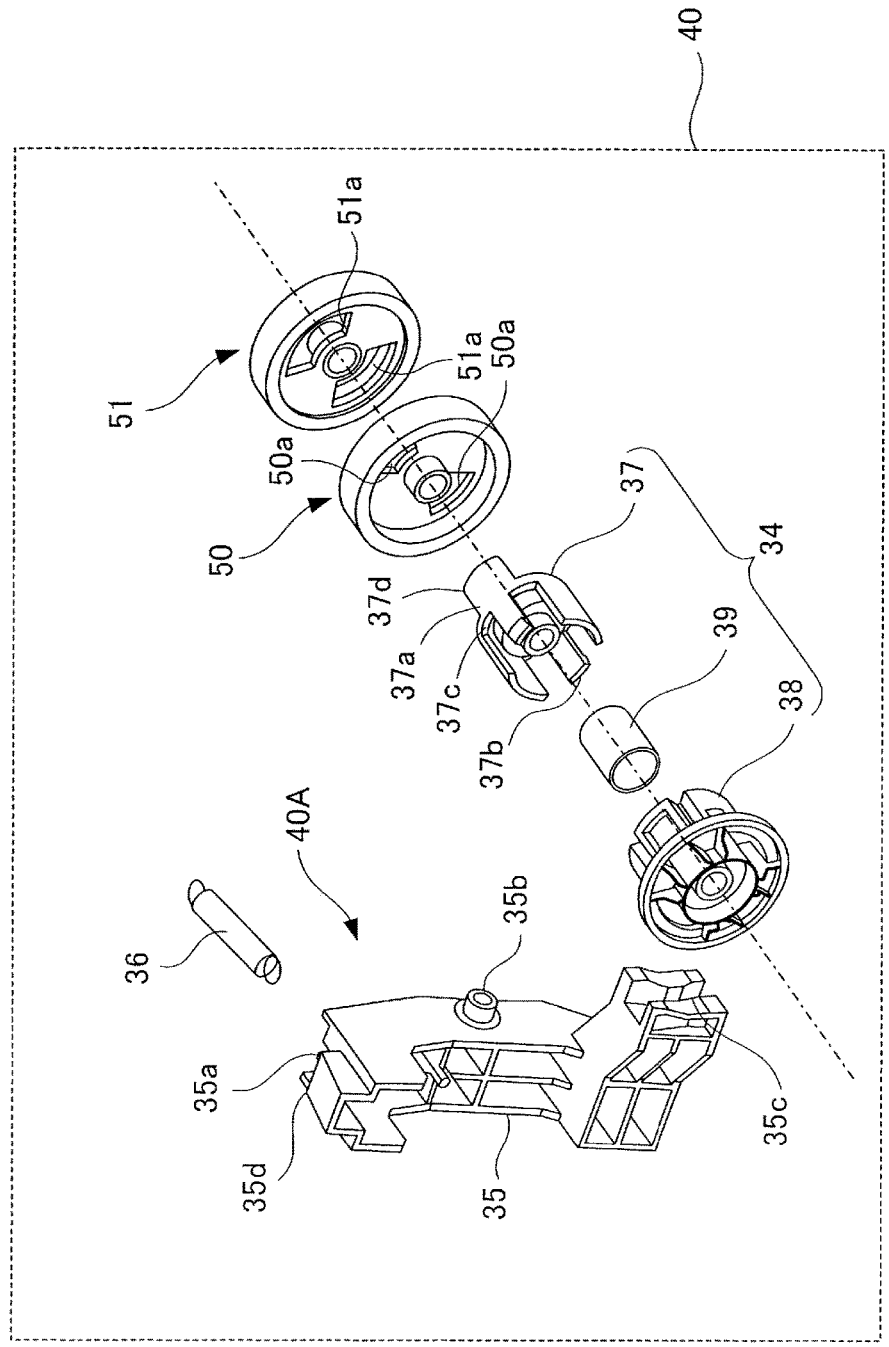
FIG. 10 is an exploded perspective view illustrating a configuration of a modified example of the drive transmission mechanism.

A case has been described above where three engagement pieces 37a are provided on the drive engagement claw 37, three insertion holes 32a are provided on the drive transmission gear 32, and three opening portions 33b are provided on the drive transmission pulley 33, but the present disclosure is not restricted to this example. For example, as illustrated in FIG. 10, it is possible to provide two engagement pieces 37a on the drive engagement claw 37, and two engagement holes 50a on a drive transmission gear 50 at the same phases as the engagement pieces 37a of the drive engagement claw 37. Further, it is possible to provide two opening portions 33b on a drive transmission pulley 51 into which the end portions of the engagement pieces 37a on the drive engagement claw 37 are inserted.

Figure 11A:
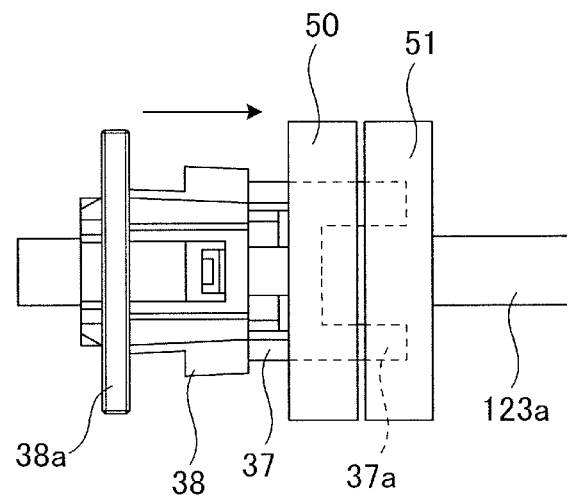
FIG. 11A is a side view illustrating the drive transmission mechanism according to the modified example in a drive transmission state.

FIG. 11A illustrates a drive transmission state of the drive transmission mechanism. In the drive transmission state, the engagement pieces 37a of the drive engagement claw 37 are inserted to engagement holes 50a of the drive transmission gear 50 and engagement holes 51a of the drive transmission pulley 51. Thereby, in a state where the drive transmission gear 50 is rotated, the drive is transmitted to the drive transmission pulley 51 via the engagement pieces 37a of the drive engagement claw 37.

Figure 11B:
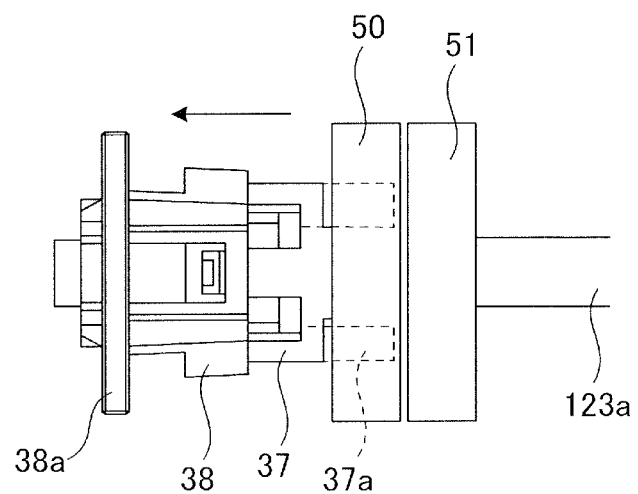
FIG. 11B is a side view illustrating the drive transmission mechanism in the drive transmission release state.

FIG. 11B illustrates a drive transmission release state. In the drive release state, the engagement pieces 37a of the drive engagement claw 37 are inserted to the engagement holes 50a of the drive transmission gear 50, but are not inserted to the engagement holes 51a of the drive transmission pulley 51, and the engagement pieces 37a are separated from the drive transmission pulley 51. In this state, the drive is not transmitted to the drive transmission pulley 51 via the engagement pieces 37a of the drive engagement claw 37 even if the drive transmission gear 50 is rotated, and the drive transmission pulley 51 is not rotated.

The drive transmission gear 32 and the drive transmission pulley 33 of FIG. 7 adopt a similar configuration as the drive transmission state and the drive transmission release state of the drive transmission mechanism according to FIGS. 11A and 11B. That is, the drive transmission gear 50 according to FIGS. 11A and 11B can be replaced with the drive transmission gear 32, and the drive transmission pulley 51 can be replaced with the drive transmission pulley 33.

An example has been described in which the second rotary member, that is, the drive transmission pulley 33, is fixed to the shaft, and the first rotary member, that is, the drive transmission gear 32, is provided rotatably on the shaft, but the present disclosure is not restricted to this example. In other words, the present disclosure merely requires the first rotary member and the second rotary member to be relatively rotatable, that is, to rotate mutually independently, and for example, a configuration can be adopted where the first rotary member is provided rotatably on the shaft and the second rotary member is also provided rotatably on the shaft. In the above description, an example has been described in which the sheet conveyance apparatus according to the present disclosure is provided on the image reading apparatus, but the present disclosure is not restricted to this example, and the sheet conveyance apparatus according to the present disclosure can be provided on an image forming apparatus.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-109324, filed on May 31, 2016, which is hereby incorporated by reference wherein in its entirety.

What is claimed is:

1. A sheet conveyance apparatus comprising:
a conveyance roller configured to convey a sheet;
a driving source configured to drive the conveyance roller; and
a drive transmission mechanism configured to transmit a driving force from the driving source to the conveyance roller, the drive transmission mechanism comprising:
a shaft;
a first rotary member supported on the shaft and driven to rotate by the driving source;
a second rotary member supported on the shaft and connected to the conveyance roller so as to rotate the conveyance roller; and
a coupling member engaged with the first rotary member and rotated integrally with the first rotary member, the coupling member comprising a body portion positioned on a side opposite from the second rotary member in an axial direction of the shaft with respect to the first rotary member and a projected portion projected from the body portion and extending toward the second rotary member in the axial direction through the first rotary member,
the coupling member being movable in the axial direction between a coupling position, at which the projected portion engages with the second rotary member such that the second rotary member rotates integrally with the first rotary member, and a release position, at which the projected portion is separated from the second rotary member such that a relative rotation of the second rotary member with respect to the first rotary member is permitted,
wherein the first rotary member comprises an opening portion through which the projected portion of the coupling member is inserted, and
the second rotary member comprises an engagement portion engaging with the projected portion projected from the first rotary member through the opening portion.

2. The sheet conveyance apparatus according to claim 1, further comprising:
a guide portion defining a sheet conveyance path through which a sheet conveyed by the conveyance roller passes; and
an opening and closing member provided movably to open and close the sheet conveyance path,
wherein the coupling member moves from the coupling position to the release position in a case where the opening and closing member is opened.

3. The sheet conveyance apparatus according to claim 2, further comprising:

a support member engaged with the coupling member and relatively movable with respect to the coupling member in the axial direction;

an interlocking member engaged with the support member, the interlocking member being moved in response to opening and closing of the opening and closing member so as to move the support member in the axial direction; and a biasing member provided between the coupling member and the support member such that the coupling member is biased toward the second rotary member with respect to the support member, wherein in a case where the opening and closing member is closed, the interlocking member moves the support member in a projecting direction of the projected portion, such that the coupling member moves to the coupling position in a state being biased by the biasing member, and in a case where the opening and closing member is opened, the interlocking member moves the support member in a retreating direction opposite from the projecting direction, such that the coupling member moves integrally with the support member to the release position.

4. The sheet conveyance apparatus according to claim 3, further comprising an urging member connected to the interlocking member such that in a case where the opening and closing member is opened, the interlocking member is moved to a first position where the coupling member is positioned at the release position, and wherein in a case where the opening and closing member is closed, the interlocking member is pressed by the opening and closing member and moves to a second position where the coupling member is positioned at the coupling position by resisting against an urging force of the urging member.

5. The sheet conveyance apparatus according to claim 4, wherein the interlocking member is provided swingably around a swing shaft orthogonal to the axial direction of the shaft, and the interlocking member comprises a contact portion provided on a first swing end of the interlocking member with respect to the swing shaft and configured to move the support member by abutting against the support member in response to a movement of the interlocking member between the first position and the second position, and a regulation portion provided on a second swing end of the interlocking member with respect to the swing shaft and configured to abut against the opening and closing member in a state where the opening and closing member is closed, so as to regulate movement of the interlocking member to the first position by the urging force of the urging member.

6. The sheet conveyance apparatus according to claim 1, wherein in a case where the coupling member is positioned at the coupling position, the projected portion engages with the engagement portion in a state projected from the first rotary member through the opening portion, and in a case where the coupling member is positioned at the release position, the projected portion is separated from the engagement portion.

7. The sheet conveyance apparatus according to claim 6, wherein the projected portion comprises a plurality of claws arranged at a plurality of positions in a circumferential direction around an axis of the shaft, and wherein the opening portion is one of a plurality of opening portions, the engagement portion is one of a plurality of engagement portions, and the opening portions and the engagement portions are respectively provided at a plurality of positions corresponding to the plurality of claws with respect to the circumferential direction.

8. The sheet conveyance apparatus according to claim 7, wherein the projected portion of the coupling member comprises a tapered surface formed such that a width in the circumferential direction further decreases as the tapered surface extends downstream in a projecting direction of the projected portion.

9. The sheet conveyance apparatus according to claim 1, further comprising an upstream rotary member disposed on an axis parallel to the shaft and arranged between the driving source and the first rotary member, and configured to drive the first rotary member to rotate by being driven by the driving source, wherein the coupling member is configured to move between the coupling position and the release position in a state where a positional relationship of the upstream rotary member and the first rotary member in the axial direction is fixed.

10. The sheet conveyance apparatus according to claim 9, wherein the upstream rotary member and the first rotary member are helical gears meshed with each other.

11. The sheet conveyance apparatus according to claim 1, further comprising:

a downstream rotary member disposed on an axis parallel with the shaft, and connected to the second rotary member; and a second conveyance roller driven by the downstream rotary member, where the conveyance roller is a first conveyance roller, wherein the second conveyance roller is configured to rotate idly in a state where the coupling member is positioned at the release position.

12. The sheet conveyance apparatus according to claim 1, further comprising:

an opening and closing member configured to be opened and closed with respect to an apparatus body of the sheet conveyance apparatus; and a connecting portion engaged with the body portion of the coupling member on the side opposite from the second rotary member in the axial direction, wherein the coupling member and the opening and closing member is connected via the connecting portion such that the coupling member is moved from the coupling position to the release position and vice versa along with opening and closing of the opening and closing member.

13. An image reading apparatus comprising:

an image reading unit configured to read an image on a sheet; and a sheet conveyance apparatus comprising:

a conveyance roller configured to convey the sheet;

a driving source configured to drive the conveyance roller; and a drive transmission mechanism configured to transmit a driving force from the driving source to the conveyance roller, the drive transmission mechanism comprising:

a shaft;

a first rotary member supported on the shaft and driven to rotate by the driving source;

a second rotary member supported on the shaft and connected to the conveyance roller so as to rotate the conveyance roller; and a coupling member engaged with the first rotary member and rotated integrally with the first rotary member, the coupling member comprising a body portion positioned on a side opposite from the second rotary member in an axial direction of the shaft with respect to the first rotary member and a projected portion projected from the body portion and extending toward the second rotary member in the axial direction through the first rotary member, the coupling member being movable in the axial direction between a coupling position, at which the projected portion engages with the second rotary member such that the second rotary member rotates integrally with the first rotary member, and a release position, at which the projected portion is separated from the second rotary member such that a relative rotation of the second rotary member with respect to the first rotary member is permitted, wherein the first rotary member comprises an opening portion through which the projected portion of the coupling member is inserted, and the second rotary member comprises an engagement portion engaging with the projected portion projected from the first rotary member through the opening portion.

14. An image forming apparatus comprising:

an image forming portion configured to form an image on a sheet; and a sheet conveyance apparatus comprising:

a conveyance roller configured to convey the sheet;

a driving source configured to drive the conveyance roller; and a drive transmission mechanism configured to transmit a driving force from the driving source to the conveyance roller, the drive transmission mechanism comprising:

a shaft;

a first rotary member supported on the shaft and driven to rotate by the driving source;

a second rotary member supported on the shaft and connected to the conveyance roller so as to rotate the conveyance roller; and a coupling member engaged with the first rotary member and rotated integrally with the first rotary member, the coupling member comprising a body portion positioned on a side opposite from the second rotary member in an axial direction of the shaft with respect to the first rotary member and a projected portion projected from the body portion and extending toward the second rotary member in the axial direction through the first rotary member, the coupling member being movable in the axial direction between a coupling position, at which the projected portion engages with the second rotary member such that the second rotary member rotates integrally with the first rotary member, and a release position, at which the projected portion is separated from the second rotary member such that a relative rotation of the second rotary member with respect to the first rotary member is permitted, wherein the first rotary member comprises an opening portion through which the projected portion of the coupling member is inserted, and the second rotary member comprises an engagement portion engaging with the projected portion projected from the first rotary member through the opening portion.

15. A sheet conveyance apparatus comprising:

a conveyance roller configured to convey a sheet;

a driving source configured to drive the conveyance roller; and a drive transmission mechanism configured to transmit a driving force from the driving source to the conveyance roller, the drive transmission mechanism comprising:

a shaft;

a gear supported on the shaft and driven to rotate by the driving source;

a pulley supported on the shaft and connected to the conveyance roller so as to rotate the conveyance roller; and an engagement claw engaged with the gear so as to rotate integrally with the gear, the engagement claw being movable in an axial direction of the shaft between a coupling position, at which the engagement claw engages with the pulley such that the pulley is rotated integrally with the gear, and a release position, at which the engagement claw is separated from the pulley such that a relative rotation of the pulley with respect to the gear is permitted.

* * * * *